United States Patent
Do et al.

(10) Patent No.: US 8,228,170 B2
(45) Date of Patent: *Jul. 24, 2012

(54) USING SENSORS TO IDENTIFY OBJECTS PLACED ON A SURFACE

(75) Inventors: Lydia M. Do, Raleigh, NC (US);
Pamela A. Nesbitt, Tampa, FL (US);
Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1231 days.

This patent is subject to a terminal disclaimer.

(21) Appl. No.: 11/971,943

(22) Filed: Jan. 10, 2008

(65) Prior Publication Data
US 2009/0179734 A1   Jul. 16, 2009

(51) Int. Cl.
*G08B 5/22* (2006.01)
*H04Q 5/22* (2006.01)
*H03K 17/94* (2006.01)
*G01J 5/02* (2006.01)

(52) U.S. Cl. ............ 340/7.54; 340/7.51; 340/7.61; 340/10.1; 340/5.32; 340/815.53; 341/20; 250/339.02

(58) Field of Classification Search .............. None
See application file for complete search history.

(56) References Cited

U.S. PATENT DOCUMENTS

| | | | |
|---|---|---|---|
| 3,694,578 A | 9/1972 | Reid | |
| 5,046,120 A * | 9/1991 | Bishop | 382/260 |
| 5,990,900 A | 11/1999 | Seago | |
| 6,069,696 A | 5/2000 | McQueen et al. | |
| 6,259,568 B1 | 7/2001 | Rybczynski | |
| 6,384,414 B1 * | 5/2002 | Fisher et al. | 250/339.14 |
| 6,608,636 B1 | 8/2003 | Roseman | |
| 6,720,874 B2 * | 4/2004 | Fufido et al. | 340/541 |
| 6,819,222 B2 * | 11/2004 | Lin et al. | 340/10.31 |
| 7,065,711 B2 | 6/2006 | Hata et al. | |
| 7,656,394 B2 | 2/2010 | Westerman et al. | |

(Continued)

FOREIGN PATENT DOCUMENTS

EP    1065481 A2    1/2001

(Continued)

OTHER PUBLICATIONS

"World's $1^{st}$ Surface Computing iBar", MOBIZ, http://mobchina.blogspot.com/2007/09/worlds-1st-surface-computing-ibar.html, Sep. 15, 2007, 6 pages.

(Continued)

*Primary Examiner* — Jennifer Mehmood
*Assistant Examiner* — Fekadeselassie Girma
(74) *Attorney, Agent, or Firm* — Francis Lammes; Stephen J. Walder, Jr.; Jeffrey S. LaBaw (57) ABSTRACT

Mechanisms are provided for identifying an object placed on a clear surface. An indication is received that an object has been placed on the surface. A plurality of physical characteristics are identified that are associated with the object. Using the plurality of physical characteristics, a data structure is searched to determine the existence of a single object with physical characteristics that matches the plurality of physical characteristics. Responsive to a match, a determination is made as to whether the single object has an associated presentation. Responsive to an existence of the associated presentation, the associated presentation is presented to a user through the clear surface on which the object has been placed.

21 Claims, 4 Drawing Sheets

U.S. PATENT DOCUMENTS

| | | | |
|---|---|---|---|
| 2001/0044858 A1 | 11/2001 | Rekimoto | |
| 2002/0057208 A1* | 5/2002 | Lin et al. | 340/825.49 |
| 2002/0109719 A1 | 8/2002 | Hata et al. | |
| 2004/0175680 A1 | 9/2004 | Hlavac et al. | |
| 2006/0074923 A1* | 4/2006 | Gower et al. | 707/100 |
| 2006/0224645 A1 | 10/2006 | Kadi | |
| 2006/0284874 A1 | 12/2006 | Wilson | |
| 2007/0046775 A1 | 3/2007 | Ferren et al. | |
| 2008/0192059 A1 | 8/2008 | Kennedy | |
| 2009/0085877 A1 | 4/2009 | Chang et al. | |
| 2009/0109180 A1 | 4/2009 | Do et al. | |
| 2009/0147003 A1 | 6/2009 | Do et al. | |
| 2009/0147008 A1 | 6/2009 | Do et al. | |
| 2009/0150802 A1 | 6/2009 | Do et al. | |
| 2010/0013676 A1* | 1/2010 | Do et al. | 341/20 |

FOREIGN PATENT DOCUMENTS

| | | |
|---|---|---|
| WO | WO03/058518 A2 | 7/2003 |
| WO | WO2007/098560 A1 | 9/2007 |

OTHER PUBLICATIONS

"Microsoft Surface—surface and gesture based computing lands", engadget, http://www.engadget.com/2007/05/30/microsoft-surface-surface-and-gesture-based-computing-lands/, May 30, 2007, 23 pages.

Larsen, Larry, "First Look: Microsoft Surface Computer!", Channel 10, http://on10.net/Blogs/larry/first-look-microsoft-surfacing-computing/, May 30, 2007, 3 pages.

Wilson, Mark, "ROSIE Coffee Table is Apple Surface", Savant, http://gizmodo.com/gadgets/savant/rosie-coffee-table-is-apple-surface-296534.php, Sep. 5, 2007, 2 pages.

Office Action dated Jan. 7, 2011 received from the Chinese Patent Office (SIPO) for Application No. 200910001627.8, 4 pages (English translation).

Office Action dated Jan. 7, 2011 received from the Chinese Patent Office (SIPO) for Application No. 200910001627.8, 6 pages (untranslated).

U.S. Appl. No. 11/924,461, 2 pages.

U.S. Appl. No. 11/951,889, 2 pages.

U.S. Appl. No. 11/953,490, 1 page.

"Infrared", Wikipedia, http://en.wikipedia.org/wiki/Infrared, printed Oct. 12, 2007, 13 pages.

"Microsoft Surface", Microsoft Corporation, http://www.microsoft.com/surface, printed Oct. 12, 2007, 1 page.

"Shape Matching and Object Recognition", University of California, Berkeley, http://www.eecs.berkeley.edu/Research/Projects/CS/vision/shape/, printed Oct. 12, 2007, 2 pages.

"Visible spectrum", Wikipedia, http://en.wikipedia.org/wiki/Visible_light, printed Oct. 12, 2007, 4 pages.

Izadi, Shahram et al., "C-Slate: A Multi-Touch and Object Recognition System for Remote Collaboration using Horizontal Surfaces", Second Annual IEEE International Workshop on Horizontal Interactive Human-Computer System, Newport, Rhode Island, Oct. 10-12, 2007, pp. 3-10.

Lok, Benjamin et al., "Effects of Handling Real Objects and Avatar Fidelity on Cognitive Task Performance in Virtual Environments", Proceedings of the IEEE Virtual Reality, Charlotte, North Carolina, Mar. 22-26, 2003, pp. 125-132.

Schechter, Bruce, "Green machine", IBM Corporation, http://domino.research.ibm.com/comm/wwwr_thinkresearch.nsfpages/machine399.html, printed Oct. 12, 2007, 2 pages.

Yan, Ping et al., "A fast algorithm for ICP-based 3D shape biometrics", ScienceDirect, Nov. 2006, 8 pages.

* cited by examiner

USING SENSORS TO IDENTIFY OBJECTS PLACED ON A SURFACE

BACKGROUND

1. Technical Field

The present application relates generally to an improved data processing system and method. More specifically, the present application is directed to use sensors to identify objects placed on a surface.

2. Description of Related Art

There are currently products which are able to identify that an object has been placed on a surface. For example, a scale within a checkout system of a grocery store can detect that produce has been placed on the surface by determining a weight change. However, unless the user identifies the object by scanning a barcode or entering an identification code, the scale has no means for identifying the object. Likewise, once the item is identified, the checkout system uses the weight of the object along with the weight of other objects scanned by the user in calculating a total weight to ensure that the user is not removing objects from the store without paying for them.

One known identification system is Surface™ from Microsoft Corporation, which is a display in a table-like form that is easy for individuals or small groups to interact with in a way that feels familiar. Surface™ is a multi-touch interactive system that allows one or more users to interact with the display. Surface™ can simultaneously recognize dozens of movements, such as touch and gestures, and may also perform multiple identifications at one time. Surface™ is able make multiple identifications by recognizing objects placed on the table-like display that have identification tags similar to bar codes. When Surface™ identifies an item using the identification tags, the table-like display presents a unique video associated with the object. Another known identification system is the Rosie Coffee Table from Savant Systems™, which performs similar identification of objects using an Apple® computer.

While known identification systems such as Surface™ are capable of identifying objects placed on a surface, these known identification systems require that the objects be identified through the use of an identification tags or bar codes. However in a typical real-world scenario, not all objects used by a user that are placed on a surface of the identification system have identification tags with which the system operates.

SUMMARY

The illustrative embodiments provide mechanisms for identifying an object without an identification tag that is placed on a surface by using sensors that identify characteristics associated with the object. By identifying characteristics, such as weight, area, temperature, geometric shape, characteristic markings, or the like, an object may be directly or indirectly identified. Once the object is identified, audio, video, a combination of audio and video, text, graphical images, pictures, and/or the like, information may be displayed to the user. Additionally, based on changes in the characteristics of the objects, other users may be notified of the changes so that an action may be performed by these other users. For example, if a patron of a restaurant places an empty glass on the surface of the illustrative embodiments, a notification that the glass is empty may be sent to wait staff personnel so that the wait staff may address the issue with the patron.

The illustrative embodiments provide for identifying an object placed on a surface. The illustrative embodiments receive an indication that an object has been placed on the surface. The illustrative embodiments identify a plurality of physical characteristics associated with the object. Using the plurality of physical characteristics, the illustrative embodiments search a data structure to determine the existence of a single object with physical characteristics that matches the plurality of physical characteristics. Responsive to a match, the illustrative embodiments determine if the single object has an associated presentation. Responsive to the existence of the associated presentation, the illustrative embodiments present the associated presentation to a user.

In other illustrative embodiments, a computer program product comprising a computer usable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
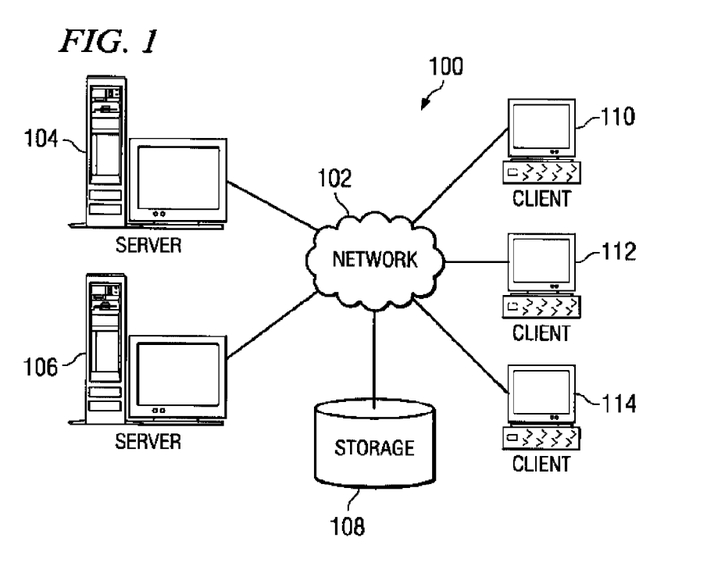
FIG. 1 is an exemplary representation of an exemplary distributed data processing system in which aspects of the illustrative embodiments may be implemented.
Figure 2:
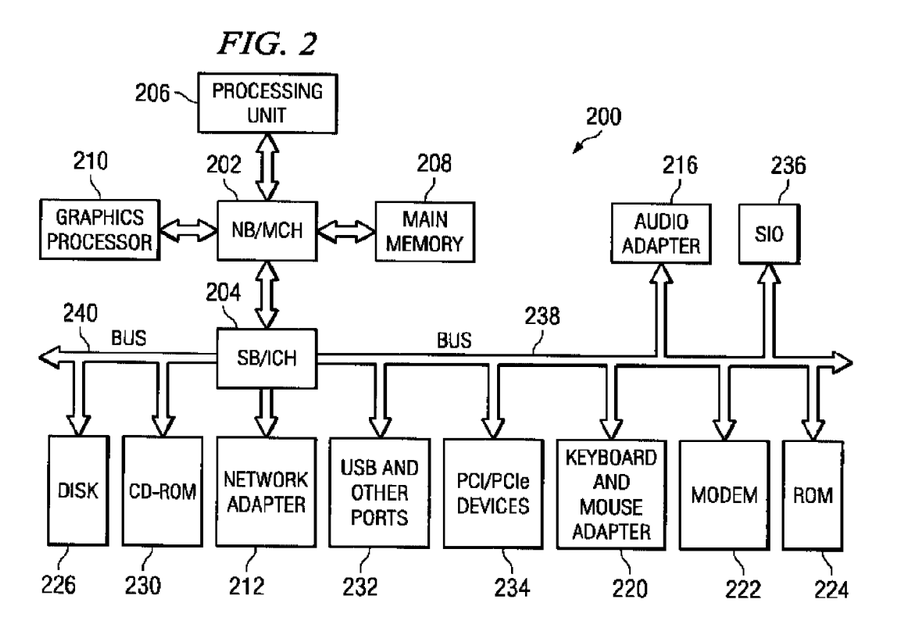
FIG. 2 is a block diagram of an exemplary data processing system in which aspects of the illustrative embodiments may be implemented.

The illustrative embodiments provide mechanisms for identifying an object without an identification tag that is placed on a surface by using sensors that identify characteristics associated with the object. As such, the mechanisms of the illustrative embodiments are especially well suited for implementation within a stand alone data processing device or a distributed data processing environment and within, or in association with, data processing devices, such as servers, client devices, and the like. While the mechanisms of the illustrative embodiments may be implemented in a stand alone device or a distributed data processing environment, the following description is directed to the distributed data processing environment for illustration purposes. In order to provide a context for the description of the mechanisms of the illustrative embodiments, FIGS. 1-2 are provided hereafter as examples of a distributed data processing system, or environment, and a data processing device, in which, or with which, the mechanisms of the illustrative embodiments may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as host 110 in FIG. 1, in which computer usable code or instructions implementing the processes for illustrative embodiments of the present invention may be located.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent nonvolatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

The preferred embodiment is implemented in, or in association with, a surface such as Surface™ from Microsoft Corporation. Surface™ is essentially a Windows Vista® PC tucked inside a black table base, topped with a 30-inch touchscreen in a clear acrylic frame. Five cameras that can sense nearby objects are mounted beneath the screen. Users can interact with the machine by touching or dragging their fingertips and objects such as paintbrushes across the screen. In addition to recognizing finger movements, Surface™ may also identify real-world items tagged with special barcode labels. For example, when a diner sets down a wine glass tagged with a special barcode, the Surface™ may automatically offer additional wine choices tailored to the dinner being eaten.

The four main components being important in the Surface™ interface are direct interaction, multi-touch contact, a multi-user experience, and object recognition via a special barcode. The device also enables drag and drop digital media when wi-fi enabled devices are placed on its surface such as a Microsoft Zune™, cellular phones, or digital cameras. The Surface™ technology allows non-digital objects to be used as input devices. In one example, a normal paint brush was used to create a digital painting in the software. Using cameras for vision makes it possible for Surface™ to not rely on restrictive properties required of conventional touchscreen or touchpad devices such as the capacitance, electrical resistance, or temperature of the tool used.

The Surface™ "vision" is created by a near-infrared, 850-nanometer-wavelength LED light source aimed at the surface. When an object touches the tabletop, the light is reflected to multiple infrared cameras with a net resolution of 1280×960, allowing it to sense, and react to items touching the tabletop. While Surface™ is capable of identifying objects placed on a surface, Surface™ requires that the objects be identified through the use of identification tags or bar codes. However in a typical real-world scenario, not all objects used by a user that are placed on a surface of the identification system have identification tags with which the system operates.

However, one of ordinary skill in the art would appreciate that the data processing system 200 may take the form of any of a number of different data processing systems including client computing devices, server computing devices, a tablet computer, laptop computer, telephone or other communication device, or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide mechanisms for identifying an object without an identification tag that is placed on a surface by using sensors that identify characteristics associated with the object. By identifying characteristics, such as weight, area, temperature, geometric shape, characteristic markings, or the like, an object may be directly or indirectly identified. Once the object is identified, audio, video, a combination of audio and video, text, graphical images, pictures, and/or the like, information may be displayed to the user. Additionally, based on changes in the characteristics of the objects, other users may be notified of the changes so that an action may be performed by these other users.

Figure 3:
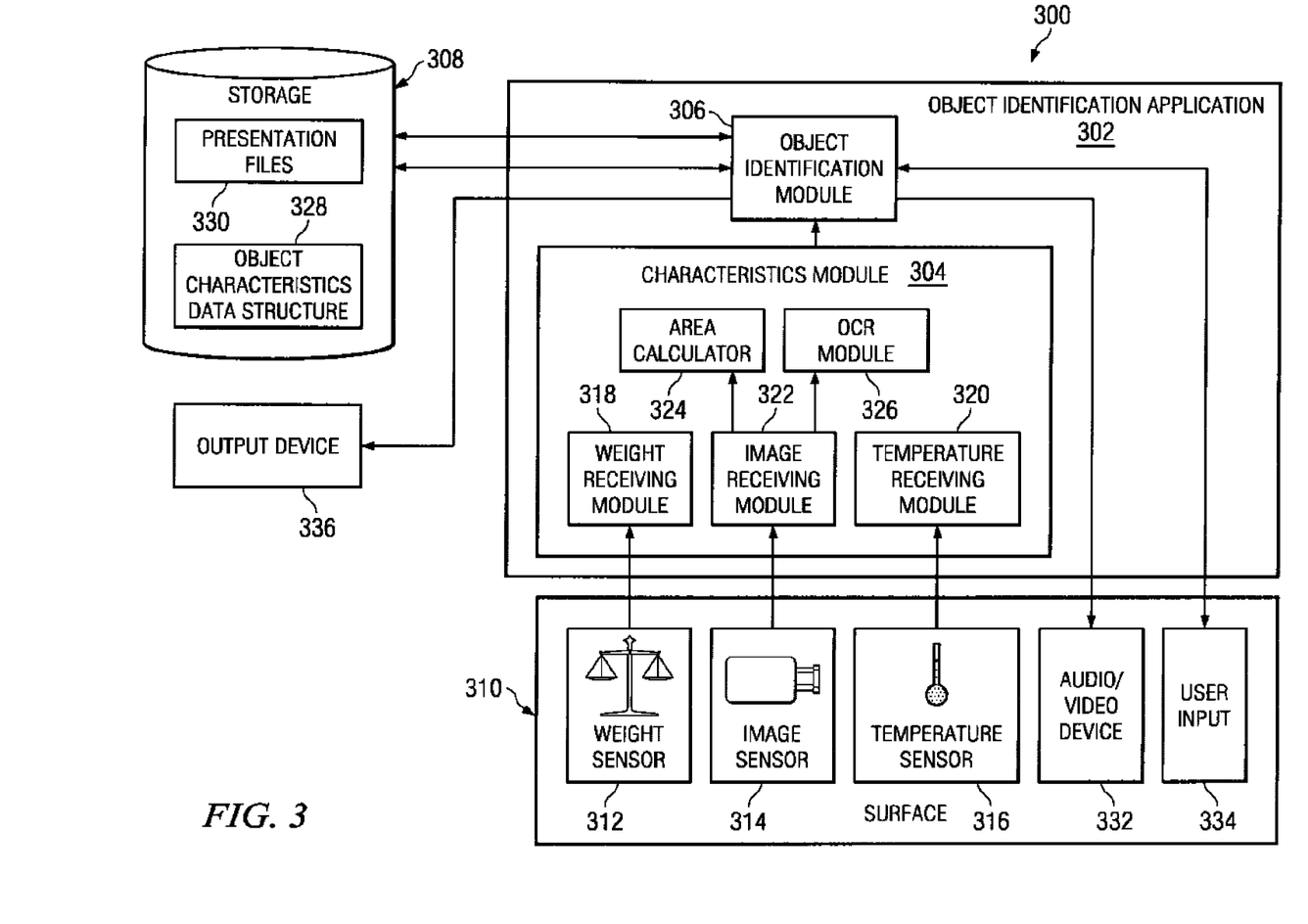
FIG. 3 depicts an exemplary functional block diagram of an object recognition system in accordance with an illustrative embodiment.

FIG. 3 depicts an exemplary functional block diagram of an object recognition system in accordance with an illustrative embodiment. Object recognition system 300 includes object identification application 302, which is an application that may be executed by a processing unit such as processing unit 206 of FIG. 2, surface 310, and storage 308. Object identification application 302, surface 310, and storage 308 may be located on a client device or object identification application 302 may be reside within a server, such as server 104 of FIG. 1, and communicate to surface 310, which is associated with the client device such as client 110 of FIG. 4, and storage 308 through a network, such as network 102 of FIG. 1. Object identification application 302 may comprise characteristics module 304 and object identification module 306. Surface 310 may be a clear surface that is part of a structure such that various sensors are located beneath surface 310, a solid surface with various sensors above surface 310, or any structure where sensors can determine physical characteristics, hereafter referred to as characteristics, associated with an object that is placed on surface 310. Surface 310 may be a surface such as Surface™ from Microsoft Corporation, although the illustrative embodiments recognize that object identification application may be implemented using any type of surface that is capable of identifying characteristics associated with objects that are placed on the surface.

In this example, once an object has been placed on surface 310, sensors such as weight sensor 312, image sensor 314, and temperature sensor 316 may determine characteristics associated with the object. While this example depicts weight sensor 312, image sensor 314, and temperature sensor 316, other sensors may be used to determine the characteristics of an object placed on surface 310. Additionally, while weight sensor 312, image sensor 314, and temperature sensor 316 are illustrated as single sensors, the illustrative embodiment realize that multiple sensors for each of weight, image, and temperature, may be implemented so that multiple measurements or images may be used to increase the accuracy in detecting changes imposed on or applied to surface 310.

Weight sensor 312, which may be a piezoelectric sensor, a strain gage sensor, a pressure sensor, or the like, may detect the current weight imposed on surface 310. While the illustrative embodiments mention a piezoelectric sensor, a strain gage sensor, and a pressure sensor as examples, one of ordinary skill in the art would appreciate that other sensors may also be utilized to detect an actual weight of an object or a change in weight of a particular location on surface 310. Weight receiving module 318, which receives the weight value detected by weight sensor 312, may determine the change in the weight imposed on surface 310 just prior to the object being placed on surface 310 and the weight imposed on surface 310 just after the object is placed on surface 310, e.g. $\text{Weight}_{current} - \text{Weight}_{prior} = \Delta\text{Weight}$. Similarly, if an object is removed from surface 310, weight sensor 312 may detect the change in the weight imposed on surface 310 and weight receiving module 318 may reset the current weight value in anticipation of another object being placed on surface 310.

Weight sensor 312 may be one sensor that senses the weight change to all of surface 310 or weight sensor 312 may be a plurality of sensors that each senses the weight change to an individual section of surface 310 using, for example, a pressure sensitive overlay that divides surface 310 into a number of sections. In addition, in instances where surface 310 may have user's hands, elbows, or the like, applied to surface 310, weight values detected by weight sensor 312 in areas where the user's hands, elbows, or the like are generally placed, may not be use by object identification application 302. An initial weight of surface 310 may also be calibrated by weight receiving module 318 on initialization of surface 310 in order to determine a starting weight value for future weight calculations. Once a weight value is determined, the weight value is sent to object identification module 306 either through direct connection or via one or more data networks.

In response to an object being placed on surface 310, temperature sensor 316 may detect a current temperature of surface 310. Temperature receiving module 320, which receives the temperature detected by temperature sensor 316, may determine the change in the temperature applied to surface 310 by an object just prior to the object being placed on surface 310 and the temperature applied to surface 310 just after the object is placed on surface 310, e.g. $Temp_{current} - Temp_{prior} = \Delta Temp$. Similarly, if an object is removed from surface 310, temperature sensor 316 may detect the change in the weight imposed on surface 310 and temperature receiving module 320 may reset the current temperature in anticipation of another object being placed on surface 310.

In calculating the change in the temperature applied to surface 310, temperature receiving module 320 may calculate either a positive or a negative temperature change. For example, if a cold object of 40° F., such as a glass of iced tea, is place on surface 310 that is at an ambient temperature of 72° F., then temperature sensor 316 may detect a drop in temperature and temperature receiving module 320 would calculate 40° F.−72° F.=−32° F. decrease in temperature. Likewise, if a hot object of 140° F., such as a cup of hot coffee, is place on surface 310 that is at an ambient temperature of 72° F., then temperature sensor 316 may detect an increase in temperature and temperature receiving module 320 would calculate 140° F.−72° F.=68° F. increase in temperature. Once a temperature change value is determined, the temperature change value is sent to object identification module 306 either through direct connection or via one or more data networks.

Temperature sensor 316 may be any type of sensor that is capable of sensing the thermal characteristics of an object that is placed on surface 310. One exemplary type of thermal sensor may be an infrared radiation (IR) or infrared thermal imaging camera that provides a temperature scale and/or temperature indication. Infrared Radiation (IR) is a wavelength longer than visible light but shorter than radio waves (750 nm to 1 nm). An IR camera captures the electromagnetic radiation emitted by an object that emits a thermal characteristic. However, while the illustrative embodiments mention an infrared radiation (IR) or infrared thermal imaging camera, one of ordinary skill in the art would appreciate that other sensors may also be utilized to detect a temperature change. Thus, temperature receiving module 320 would receive the thermal characteristics captured by temperature sensor 316 based on the electromagnetic radiation emitted by the object.

Image sensor 314 may be a camera, group of cameras, or other imaged detection device, that records changes applied to surface 310. For example, if surface 310 were a clear surface, then image sensor 314 may be placed under the clear surface. When an object is placed on surface 310, then image sensor 314 may detect a change in the image just prior to the object being placed on surface 310 and the image just after the object is placed on surface 310. If the image changes, then image sensor 314 would record the image with the object and send the image to image receiving module 322. Once image receiving module 322 receives the image, the image may be sent to area calculator 324, optical character recognition (OCR) module 326, and object identification module 306 either through direct connection or via one or more data networks.

Area calculator 324 may first determine a geometric shape of the object so that an area associated with the object may be calculated. In determining the geometric shape of the object, area calculator 324 may identify the outer boundaries of the object and then divide the shape of the object into multiple geometric shapes in order to calculate an accurate area. For example, if a pencil where placed upon surface 310, area calculator 324 may divide the shape of the object into a rectangle for the length of the pencil and a triangle for the tip of the pencil in order to calculate the correct area. Once area calculator 324 determines the geometric shape or shapes associated with the object, area calculator 324 may calculate the area associated with the object recorded in the image received from image receiving module 322. Area calculator 324 may use predetermined distances associated with the size of the image recorded by image sensor 314 to determine the area associated with an object placed on surface 310. For example, if a glass is placed on surface 310, then area calculator 324 may be able to determine the diameter of the bottom of the glass. Using the diameter, area calculator 324 would be able to determine the area of the bottom of the glass using $A=\pi(d/2)^2$. Area calculator 324 may then send the calculated area value and geometric shape(s) to object identification module 306 either through direct connection or via one or more data networks. In addition to, or in lieu of, detecting the area of the object, the illustrative embodiments recognize that dimensions, such as width, radius, length, etc. of the object may also be identified and sent to object identification module 306.

OCR module 326 may analyze the image received from image receiving module 322 and perform optical character recognition of the object in the image to obtain any characteristic markings that would aid in identifying the object. For example, if a polystyrene cup is placed on surface 310, then OCR module 326 may be able to identify manufacturer markings, model number marking, and recyclable indicators. OCR module 326 then sends identified information to object identification module 306 either through direct connection or via one or more data networks.

Thus, object identification module 306 receives one or more characteristics associated with an object placed on surface 310. Object identification module 306 may receive for the object a weight value, a temperature change value, an area value, geometric shape(s), identification information, an image, or the like. Object identification module 306 may use all or a portion of the characteristics for the object to identify the object based on similar characteristics for objects stored in object characteristics data structure 328 on storage 308. Object identification module 306 compares the characteristic information received from weight receiving module 318, temperature receiving module 320, image receiving module 322, area calculator 324, and/or OCR module 326, to characteristic information for objects that are stored in object characteristics data structure 328 which may be a file, database, or the like of recognizable objects and their associated characteristics.

In comparing the characteristic for the object placed on surface 310 to the characteristics for objects stored in object characteristics data structure 328, object identification module 306 may successively match each of the characteristics that are received to the object characteristics in object characteristics data structure 328 and limit the number of identified items based on matches to each characteristic. For example, if an object is placed on surface 310, then object identification module 306 may receive characteristics, such as a weight of 8 ounces, a temperature change value of −6° F., a geometric shape of a circle, an area of 3.925 inches, and characteristic markings, such as a manufacturer, module number, and recycle symbol. Object identification module 306 may then search object characteristics data structure 328 to identify all items with a geometric shape of a circle. Once those items are identified, object identification module 306 may limit the identified items by weight, then by temperature change values, then by area, and then by characteristic marking, each time limiting the number of identified items until hopefully only one item is matched. Items identified by weight, temperature change, and area may be made within some predetermined tolerance. While this example indicates that object identification module 306 identifies in a particular order, the illustrative embodiments recognize that object characteristics data structure 328 may be searched in any order.

If there is an exact match in the compared characteristics or if the characteristics are met within some predetermined tolerance, then object identification module 306 may determine if there is an associated presentation in presentation files 330 on storage 308 that is associated with the identified object that may be presented to the user. Associated presentations in presentation files 330 may be audio presentation, video presentation, a combination of audio and video presentations, text, graphical images, pictures, and/or the like. For example, if OCR module 326 identifies characteristic markings, such as an International Standard Book Number (ISBN) barcode associated with a book that is placed on surface 310, then object identification module 306 may match the identified ISBN barcode to a barcode located in object characteristics data structure 328. Object identification module 306 may identify a video presentation in presentation files 330 that could be output to audio/video device 332. The identified presentation presented by audio/video device 332 may indicate to the user that "This book stayed atop the Best Seller list for 3 months." However, the user may also be prompted via audio/video device 332 with a list of associated presentations that are associated with the identified object from which to pick.

In another embodiment, if object identification module 306 is not able to exactly match the characteristics of the object to an object in object characteristics data structure 328, object identification module 306 may determine if an object with similar characteristics has been identified previously. For example, if a glass that is full of a liquid that has been previously identified is removed from surface 310, some amount of the liquid is removed from the glass, and the glass is returned to surface 310, then an exact match of the characteristics may not be made by object identification module 306. However, object identification module 306 may be able to determine that while the weight of the glass is not the same, the other characteristics are a match and the weight is similar to the previous identified weight but lighter by some value. Object identification module 306 may then identify the object as the glass and identify a video presentation associated with the glass in presentation files 330 that could be output to audio/video device 332. If a presentation associated with the object exists in presentation files 330, then object identification module 306 may present the presentation to the user using audio/video device 332.

In addition to object identification module 306 presenting the presentation to the user using audio/video device 332, object identification module 306 may also generate alerts based on changes in characteristics associated with a previously identified object. In one illustrative embodiment, surface 310 may be coupled to a table in a restaurant. In such an embodiment, a glass may be associated with a patron of the restaurant. If in determining that the glass is the same object previously placed on surface 310, but the weight of the glass has changed such that the glass is determined to be at a weight that would indicate that the glass needs to be refilled, then object identification module 306 may send a signal to the wait staff of the restaurant with an indication that the patron's glass is at a weight that would indicate that the glass needs to be refilled. This indication may be sent to the wait staff either through direct connection or via one or more data networks to output device 336 that the wait staff may easily recognize. While this example is directed to a glass, the illustrative embodiments recognize an expansion to other containers associated with a restaurant, such as a plate, bowl, or the like.

In a further embodiment, if object identification module 306 is not able to match any characteristics received for the object to the characteristics for an object in object characteristics data structure 328 or if object identification module 306 matches the characteristics received for the object to the characteristics to more than one object in object characteristics data structure 328, then object identification module 306 may prompt the user to identify the object. For example, if a remote control is placed on surface 310, then the characteristics of the remote control may indicate a rectangular object, area of the object to be 12 square inches, weight of 3 ounces, and a "MADE IN COUNTRY" identifier. Such characteristics may be associated not only with a remote control but also a box of pens.

Therefore, object identification module 306 may prompt the user using audio/video device 332 with a list of possible objects. The user may select from the list in order to identify the object using user input interface 334. However, if the object is not on the list presented to the user using audio/video device 332, the user may provide the identification of the object using user input interface 334. The user may provide the input through, for example, a keyboard that is displayed on surface 310. Once the user identifies the object, then object identification module 306 may store the identification of the object along with the characteristics in object characteristics data structure 328 for later use. Using the identification of the object, object identification module 306 may determine if another object with similar characteristics exists with object characteristics data structure 328. If a similar object exists, then object identification module 306 may mark the new object to use the same presentation in presentation files 330 as the other object uses. Using this marking of the object, object identification module 306 may determine if a video presentation associated with the object exists in presentation files 330 that could be output to audio/video device 332. If a presentation associated with the object exists in presentation files 330, then object identification module 306 may present the presentation to the user using audio/video device 332.

If the user does not identify the object, then object identification module 306 may store the characteristics associated with the object along with an identification of "unknown" in object characteristics data structure 328. If an object with the same or similar characteristics is encountered at a later time, then object identification module 306 may prompt the user using audio/video device 332 indicating that the last time this object was encountered no identification was provided. At this point the user may identify the object or fail once again to identify the object. If the user once again fails to identify the object, object identification module 306 may cease to prompt the user the next time the object is encountered, for the next predetermined amount of times the object is encountered, until the object identification application 302 is reinitialized, some predetermined time period, or the like.

In another embodiment, a group of objects may be placed on surface 310 at the same time and object identification module 306 may identify one object based on the identification of another object in the group of objects using a category field in object characteristics data structure 328. For example, if earrings, a necklace, and bracelet are placed on the surface 310, then while object identification module 306 may be able to identify the earring and necklace, object identification module 306 may not be able to readily identify the bracelet. However, based on the identification of the earrings and the necklace, object identification module 306 may identify the group category as "jewelry" and narrow down the identification to circular objects with a category of jewelry. Then, object identification module 306 would use the characteristics associated with the as yet identified object. For example, object identification module 306 may receive characteristics associated with the unidentified object, such as a weight of 1 ounce, no temperature change, a geometric shape of a circle, an area of 1.77 inches, and no characteristic markings. Object identification module 306 may then search only objects with a category of jewelry in object characteristics data structure 328 to identify all items with a geometric shape of a circle. Once those items are identified, object identification module 306 may limit the identified items by weight and then by area, each time limiting the number of identified items until hopefully object identification module 306 identifies a bracelet.

Thus, the illustrative embodiments provide mechanisms for identifying an object without an identification tag that is placed on a surface by using sensors that identify characteristics associated with the object. Characteristics identified may include a weight value, a temperature change value, an area value, geometric shape(s), identification information, an image, or the like. Using the characteristics, the object may be identified and a presentation may be presented to the user that is associated with the identified object.

Figure 4:
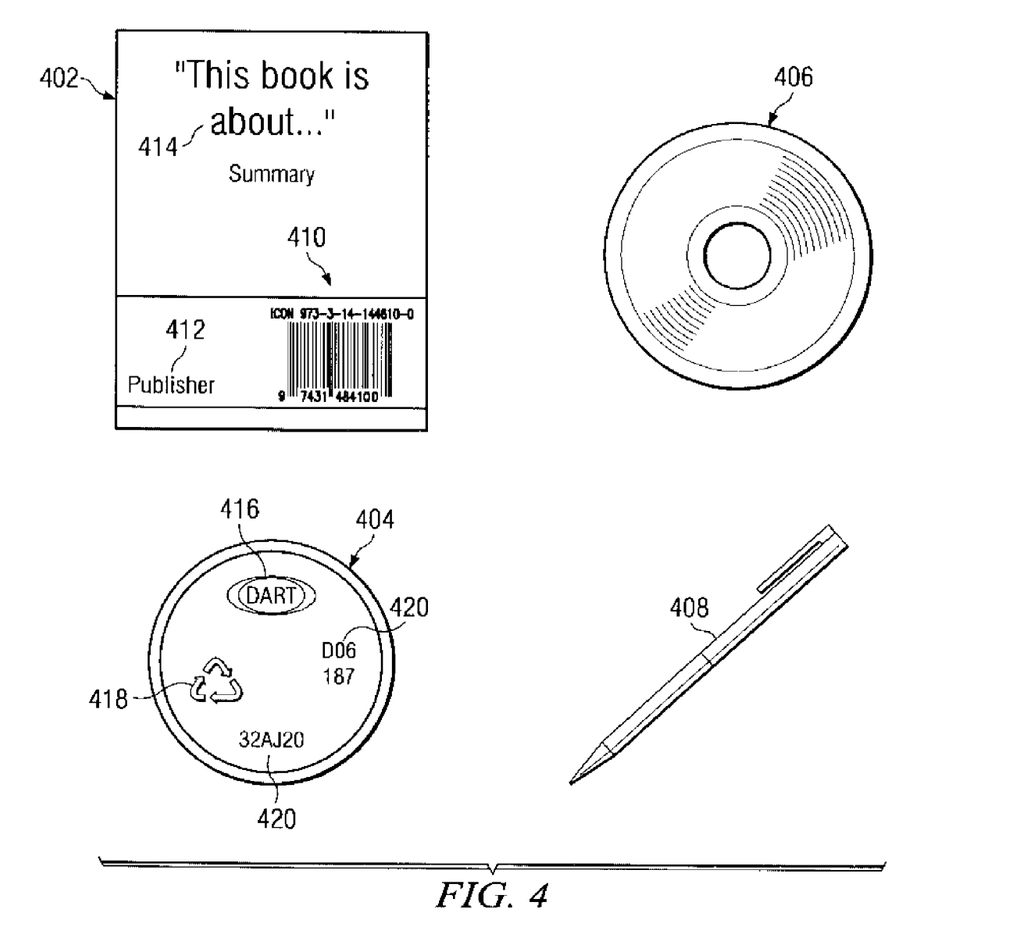
FIG. 4 depicts some exemplary objects that may be identified using an object identification application in accordance with an illustrative embodiment.

FIG. 4 depicts some exemplary objects that may be identified using an object identification application in accordance with an illustrative embodiment. As each of objects 402-408 is placed on a surface, such as surface 310 of FIG. 3, an object identification application, such as object identification application 302 of FIG. 3, may identify characteristics associated with each of objects 402-408. For object 402, the weight receiving module may calculate a weight value of 18 ounces and the temperature receiving module may determine a temperature change value of zero degrees, for example. Additionally, an area calculator may determine a geometric shape of a rectangle and an area of 5×7=35 inches, for example. Finally an optical character recognition (OCR) module may identify barcode 410, publisher 412, and additional text 414. Using these characteristics, the object identification application may identify the object as a book using the above described successive limitation of objects in an object characteristics data structure.

For object 404, the weight receiving module may calculate a weight value of 32 ounces and the temperature receiving module may determine a temperature change value of $-6°$ F., for example. Additionally, an area calculator may determine a geometric shape of a circle and an area of $(2.5/2)\times 3.14=3.925$ inches, for example. Finally, the OCR module may identify manufacturer 416, recycle image 418, and model numbers 420. Using these characteristics, the object identification application may identify the object as a polystyrene cup with a cold liquid using the above described successive limitation of objects in an object characteristics data structure.

For object 406, the weight receiving module may calculate a weight value of 0.5 ounce and the temperature receiving module may determine a temperature change value of zero degrees, for example. Additionally, an area calculator may determine a geometric shape of a circle and an area of $(4.75/2)\times 3.14=5.456$ inches, for example. Finally an optical character recognition (OCR) module may fail to identify any characters but the imaging receiving module may determine a reflective nature. Using these characteristics, the object identification application may identify the object as a compact disk (CD) or digital video disc (DVD) using the above described successive limitation of objects in an object characteristics data structure.

For object 408, the weight receiving module may calculate a weight value of 1 ounce and the temperature receiving module may determine a temperature change value of zero degrees, for example. Additionally, an area calculator may determine geometric shapes of a rectangle and triangle and an area of $(5\times 0.5)+(\frac{1}{2}\times(0.25\times 0.5))+(\frac{1}{2}\times(0.25\times 0.5))=2.625$ inches, for example. The optical character recognition (OCR) module may fail to identify any characters. Using these characteristics, the object identification application may identify the object as a pen or pencil using the above described successive limitation of objects in an object characteristics data structure.

As described previously, for objects such as objects 406 and 408, since the object identification application may have identified more than one object for each of object 406 and 408, object identification application may prompt the user to accurately identify the object. That is, for object 406, the object identification application may prompt the user to select from a list consisting of a CD, a DVD, and "other." If the user selects "other", the object identification application may prompt the user to input the name of the object.

Thus, the illustrative embodiments provide mechanisms for identifying an object that is placed on a surface by using sensors that identify characteristics, such as a weight value, a temperature change value, an area value, geometric shape(s), identification information, an image, or the like, that are associated with the object.

Figure 5:
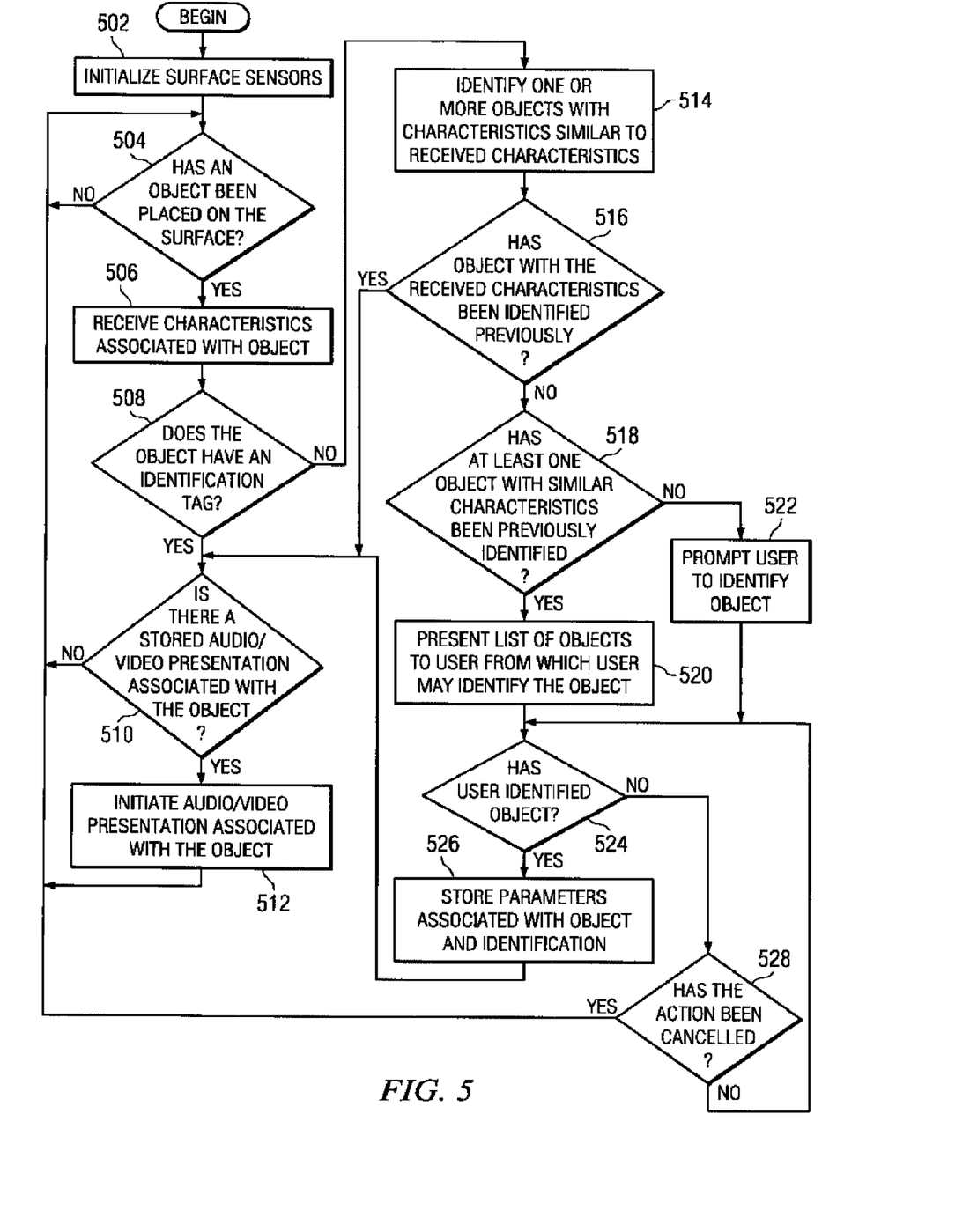
FIG. 5 depicts an exemplary initial operation of the object identification application in accordance with an illustrative embodiment.

FIG. 5 is a flowchart outlining an exemplary operation according to the invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

FIG. 5 depicts an exemplary initial operation of the object identification application in accordance with an illustrative embodiment. As the operation begins, the object identification application is initialized, which includes initializing all of the sensors associated with the surface (step 502). At this point all of the sensors associated with the surface make immediate measurements which are used in making calculations as objects are placed on the surface associated with the object identification application. Using the sensors associated with the surface, object identification application is able to determine if an object has been placed on the surface (step 504).

If at step 504 an object has not been placed on the surface, then the operation returns to step 504. If at step 504 an object has been placed on the surface, then an object identification application receives characteristics associated with the object (step 506). The characteristics may be one or more of a weight value, a temperature change value, an area value, geometric shape(s), characteristic markings, an image, or the like. The object identification module determines if the object has an identification tag, such as a barcode (step 508). If at step 508 the object has an identification tag, the object identification module determines if there is a presentation in a data structure that is associated with the identified object (step 510). If at step 510 a presentation exists in the data structure that is associated with the object, then the object identification module initiates the presentation to the user through an audio/video presentation device (step 512), with the operation returning to step 504 thereafter. The associated presentation may be audio, video, a combination of audio and video, text, graphical images, pictures, and/or the like. If at step 510 a presentation fails to exist in the data structure that is associated with the object, then the operation returns to step 504.

If at step 508 the object does not have an identification tag, the object identification module may use all or a portion of the received characteristics to identify the object based on similar characteristics for objects stored in an object characteristics data structure (step 514). The object identification module determines if an object with the received characteristics has been previously identified (step 516). The object identification module searches the characteristics associated with objects in an object characteristics data structure using the characteristic information received from a weight receiving module, a temperature receiving module, an image receiving module, an area calculator, and/or an OCR module, in order to identify the object.

If at step 516 the object identification module identifies an object that exactly matches the received characteristics or if the characteristics are met within some predetermined tolerance, then the operation proceeds to step 510. If at step 516 the object identification module fails to identify an object that exactly matches in compared characteristics or if the characteristics are not met within some predetermined tolerance, then the object identification module determines if at least one object with similar characteristics has been identified previously (step 518). If at step 518 the object identification module is able to identify at least one object, then the object identification module prompts the user with a list of the identified object(s) so that the user may identify the object (step 520). If at step 518 the object identification module is not able to identify at least one object, then the object identification module prompts the user to identify the object (step 522).

From step 520 or 522, the object identification module determines if the user has identified the object (step 524). If at step 524 the user has identified the object, then object identification module stores parameters including the object identification along with the characteristics of the object in the object characteristics data structure (step 526), with the operation proceeding to step 510 thereafter. If at step 524 the user fails to identify the object, then object identification module determines if the prompt to the user has been canceled (step 528). If at step 528 the prompt has not been canceled, then the operation returns to step 524. If at step 528 the prompt has been canceled, then the operation returns to step 504.

Thus, the illustrative embodiments provide mechanisms for identifying an object without an identification tag that is placed on a surface by using sensors that identify characteristics associated with the object. By identifying characteristics, such as weight, area, temperature, geometric shape, characteristic markings, or the like, an object may be directly or indirectly identified. Once the object is identified, audio, video, a combination of audio and video, text, graphical images, pictures, and/or the like, information may be displayed to the user. Additionally, based on changes in the characteristics of the objects, other users may be notified of the changes so that an action may be performed by these other users.

It should be appreciated that the illustrative embodiments may take the form of a specialized hardware embodiment, a software embodiment that is executed on a computer system having general processing hardware, or an embodiment containing both specialized hardware and software elements that are executed on a computer system having general processing hardware. In one exemplary embodiment, the mechanisms of the illustrative embodiments are implemented in a software product, which may include but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, or semiconductor system, apparatus, or device. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read-only memory (CD-ROM), compact disk—read/write (CD-R/W) and DVD.

The program code of the computer program product may comprise instructions that are stored in a computer readable storage medium in a client or server data processing system. In a client data processing system embodiment, the instructions may have been downloaded over a network from one or more remote data processing systems, such as a server data processing system, a client data processing system, or a plurality of client data processing systems using a peer-to-peer communication methodology. In a server data processing system embodiment, the instructions may be configured for download, or actually downloaded, over a network to a remote data processing system, e.g., a client data processing system, for use in a computer readable storage medium with the remote data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for identifying an object placed on a clear surface, the method comprising:
   receiving an indication that the object has been placed on the clear surface;
   identifying a plurality of physical characteristics associated with the object;
   using the plurality of physical characteristics, searching a data structure to determine the existence of a single object with physical characteristics that matches the plurality of physical characteristics;
   responsive to a match, determining whether the single object has an associated presentation;
   responsive to an existence of the associated presentation, presenting the associated presentation to a user through the clear surface on which the object has been placed;
   determining whether at least one of the plurality of physical characteristics associated with the single object has changed from previously identified physical characteristics associated with the single object; and
   responsive to a change in the at least one of the plurality of physical characteristics associated with the single object from the previously identified physical characteristics associated with the single object, sending an indication to another user with an identification of the single object and the change in the at least one of the plurality of physical characteristics from previously identified physical characteristics associated with the single object.

2. The method of claim 1, further comprising:
   responsive to a failure to identify the single object, searching the data structure to determine the existence of one or more objects with physical characteristics within a tolerance of the plurality of physical characteristics;
   responsive to identifying the one or more objects, prompting the user to identify the object from a list of the one or more objects;
   responsive to the user identifying the object, determining whether the object has an associated presentation; and
   responsive to the existence of the associated presentation, presenting the associated presentation to a user through the clear surface on which the object has been placed.

3. The method of claim 2, further comprising:
   responsive to a failure to identify the one or more objects, prompting the user to identify the object;
   responsive to the user identifying the object, determining whether the object has an associated presentation; and
   responsive to the existence of the associated presentation, presenting the associated presentation to a user through the clear surface on which the object has been placed.

4. The method of claim 3, further comprising:
   storing the identification of the object and the plurality of physical characteristics in the data structure.

5. The method of claim 1, wherein the plurality of physical characteristics comprise temperature and at least one of weight, area, geometric shape, or characteristic markings.

6. The method of claim 1, wherein the plurality of physical characteristics comprise at least two from the set of weight, temperature, area, geometric shape, and characteristic markings.

7. A computer program product comprising a non-transitory computer readable medium having a computer readable program, wherein the computer readable program, when executed in a data processing system, causes the data processing system to:
   receive an indication that an object has been placed on a clear surface;
   identify a plurality of physical characteristics associated with the object;
   using the plurality of physical characteristics, search a data structure to determine the existence of a single object with physical characteristics that matches the plurality of physical characteristics;
   responsive to a match, determine whether the single object has an associated presentation;
   responsive to an existence of the associated presentation, present the associated presentation to a user through the clear surface on which the object has been placed;
   determine whether at least one of the plurality of physical characteristics associated with the single object has changed from previously identified physical characteristics associated with the single object; and
   responsive to a change in the at least one of the plurality of physical characteristics associated with the single object from the previously identified physical characteristics associated with the single object, send an indication to another user with an identification of the single object and the change in the at least one of the plurality of physical characteristics from the previously identified physical characteristics associated with the single object.

8. The computer program product of claim 7, wherein the computer readable program further causes the data processing system to:
   responsive to a failure to identify the single object, search the data structure to determine the existence of one or more objects with physical characteristics within a tolerance of the plurality of physical characteristics;

responsive to identifying the one or more objects, prompt the user to identify the object from a list of the one or more objects;

responsive to the user identifying the object, determine whether the object has an associated presentation; and responsive to the existence of the associated presentation, present the associated presentation to a user through the clear surface on which the object has been placed.

9. The computer program product of claim 8, wherein the computer readable program further causes the data processing system to:

responsive to a failure to identify the one or more objects, prompt the user to identify the object;

responsive to the user identifying the object, determine whether the object has an associated presentation; and responsive to the existence of the associated presentation, present the associated presentation to a user through the clear surface on which the object has been placed.

10. The computer program product of claim 9, wherein the computer readable program further causes the data processing system to:

store the identification of the object and the plurality of physical characteristics in the data structure.

11. The computer program product of claim 7, wherein the plurality of physical characteristics comprise temperature and at least one of weight, area, geometric shape, or characteristic markings.

12. The computer program product of claim 7, wherein the plurality of physical characteristics comprise at least two from the set of weight, temperature, area, geometric shape, and characteristic markings.

13. A system, comprising:
a processor; and
a memory coupled to the processor, wherein the memory comprises instructions which, when executed by the processor, cause the processor to:
receive an indication that an object has been placed on a clear surface;
identify a plurality of physical characteristics associated with the object;
using the plurality of physical characteristics, search a data structure to determine the existence of a single object with physical characteristics that matches the plurality of physical characteristics;
responsive to a match, determine whether the single object has an associated presentation;
responsive to an existence of the associated presentation, present the associated presentation to a user through the clear surface on which the object has been placed;
determine whether at least one of the plurality of physical characteristics associated with the single object has changed from previously identified physical characteristics associated with the single object; and
responsive to a change in the at least one of the plurality of physical characteristics associated with the single object from the previously identified physical characteristics associated with the single object, send an indication to another user with an identification of the single object and the plurality of physical characteristics from the previously identified physical characteristics associated with the single object.

14. The system of claim 13, wherein the instructions further cause the processor to:

responsive to a failure to identify the single object, search the data structure to determine the existence of one or more objects with physical characteristics within a tolerance of the plurality of physical characteristics;

responsive to identifying the one or more objects, prompt the user to identify the object from a list of the one or more objects;

responsive to the user identifying the object, determine whether the object has an associated presentation; and responsive to the existence of the associated presentation, present the associated presentation to a user through the clear surface on which the object has been placed.

15. The system of claim 14, wherein the instructions further cause the processor to:

responsive to a failure to identify the one or more objects, prompt the user to identify the object;

responsive to the user identifying the object, determine whether the object has an associated presentation; and responsive to the existence of the associated presentation, present the associated presentation to a user through the clear surface on which the object has been placed.

16. The system of claim 15, wherein the instructions further cause the processor to:

store the identification of the object and the plurality of physical characteristics in the data structure.

17. The system of claim 13, wherein the plurality of physical characteristics comprise temperature and at least one of weight, area, geometric shape, or characteristic markings.

18. The system of claim 13, wherein the plurality of physical characteristics comprise at least two from the set of weight, temperature, area, geometric shape, and characteristic markings.

19. The method of claim 1, wherein a plurality of sensors that identify the plurality of physical characteristics associated with the object are beneath the clear surface.

20. The computer program product of claim 7, wherein a plurality of sensors that identify the plurality of physical characteristics associated with the object are beneath the clear surface.

21. The system of claim 13, wherein a plurality of sensors that identify the plurality of physical characteristics associated with the object are beneath the clear surface.

* * * * *